United States Patent

Safran et al.

[11] Patent Number: 4,998,772
[45] Date of Patent: Mar. 12, 1991

[54] ATTACHMENT CLIP FOR SEAT BACK SIDE SHIELD

[75] Inventors: William M. Safran, Farmington Hills; James D. Edwards, Ypsilanti, both of Mich.

[73] Assignee: Chrysler Corporation, Highland Park, Mich.

[21] Appl. No.: 518,622

[22] Filed: May 3, 1990

[51] Int. Cl.⁵ .............................................. B60N 2/02
[52] U.S. Cl. ................................... 297/355; 297/367; 24/295
[58] Field of Search ............... 297/355, 379, 341, 367, 297/370, 378; 24/295, 293, 457, 669

[56] References Cited

U.S. PATENT DOCUMENTS

| | | | |
|---|---|---|---|
| 3,631,569 | 1/1972 | Seckerson | 24/295 |
| 3,632,168 | 1/1972 | Barello | 297/379 |
| 3,740,800 | 6/1973 | Meyer | 24/195 |
| 3,952,476 | 4/1976 | Barnett et al. | 24/295 |
| 4,390,208 | 6/1983 | Widmer et al. | 297/379 |
| 4,461,514 | 7/1984 | Schwarz | 24/295 X |
| 4,642,859 | 2/1987 | Kaiser | 24/295 X |
| 4,722,571 | 2/1988 | Sweers | 297/367 |

Primary Examiner—José V. Chen
Attorney, Agent, or Firm—Edward P. Barthel

[57] ABSTRACT

An alternative attaching arrangement for a seat structure side shield panel providing ready installation and positive retention of the panel. An existing integral raised C-shaped connector, molded on the inner surface of the side shield panel, is adapted to engage an outwardly extending slotted pivot pin of the recliner apparatus of certain seat structures. An oversize seat structure, however, requires modification to accommodate the side shield panel. The present invention provides a unique U-shaped add-on metal clip which is readily snap-fitted on the C-shaped connector at a predetermined locked orientation so as to releasably engage the slotted pivot pin of the oversize seat structure.

1 Claim, 2 Drawing Sheets

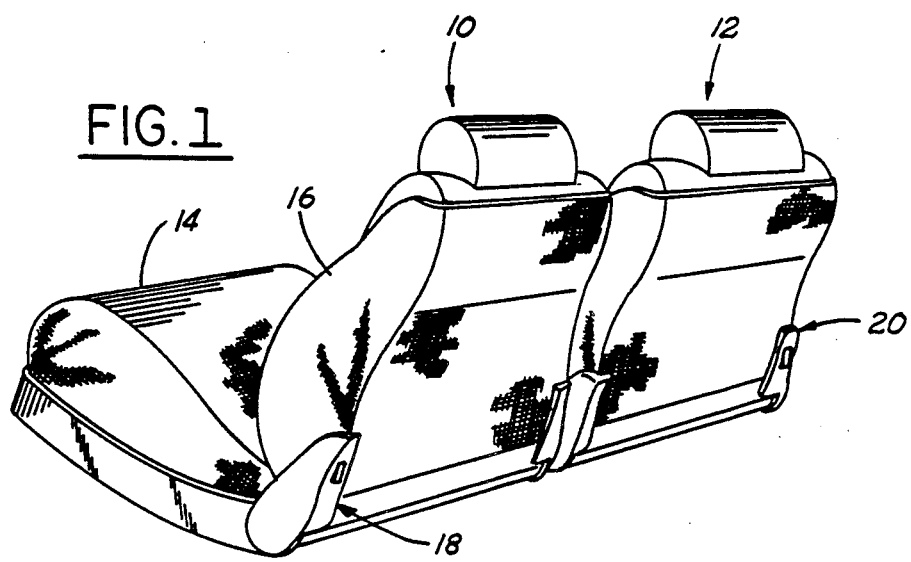
FIG. 1
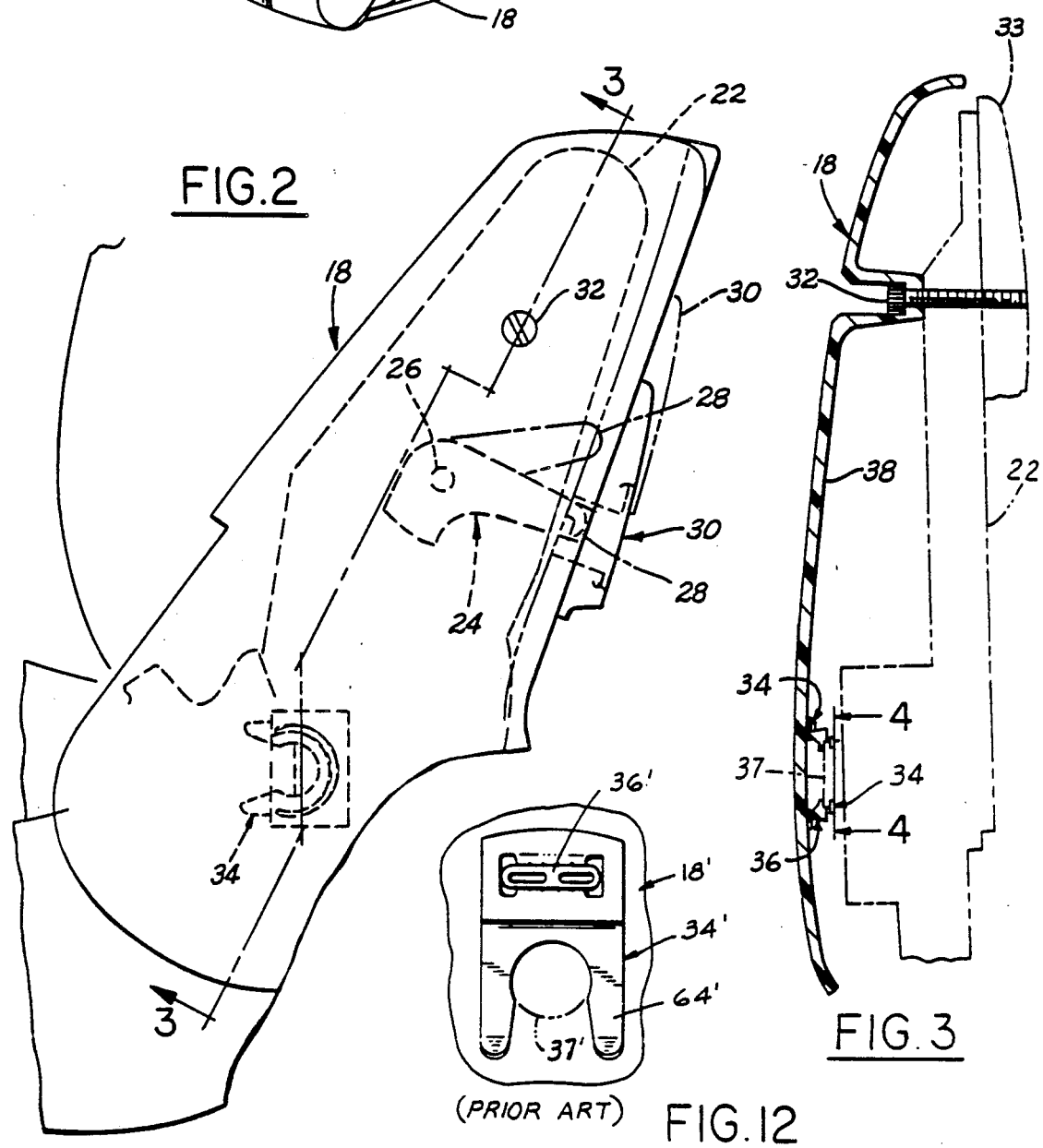
FIG. 2
FIG. 12 (PRIOR ART)
FIG. 3

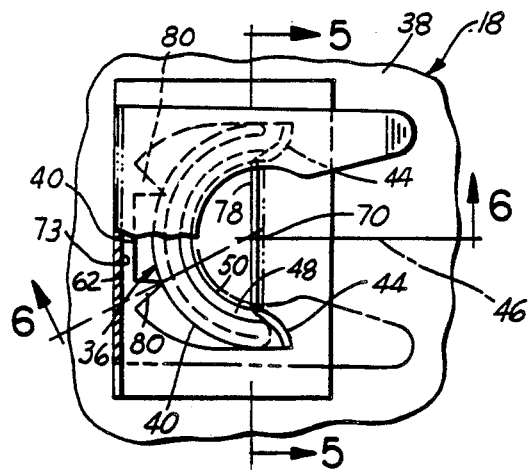
FIG. 4
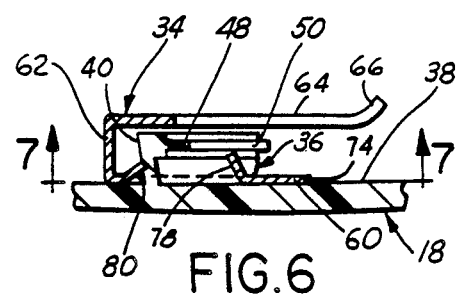
FIG. 6
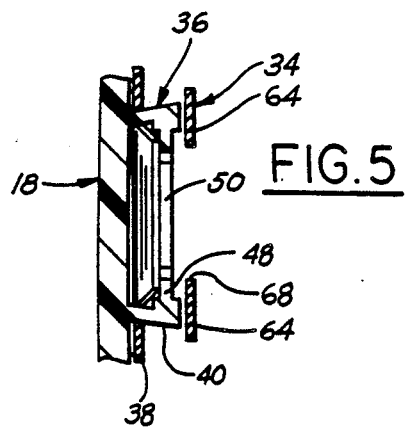
FIG. 5
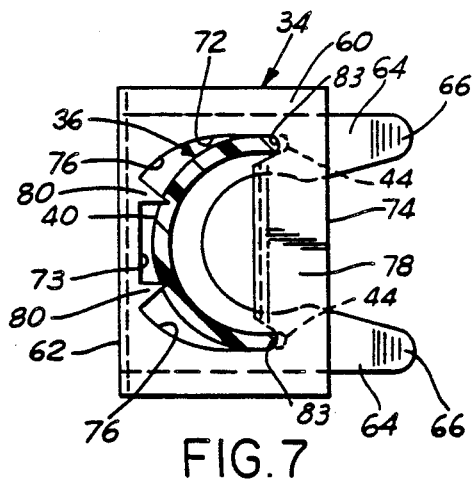
FIG. 7
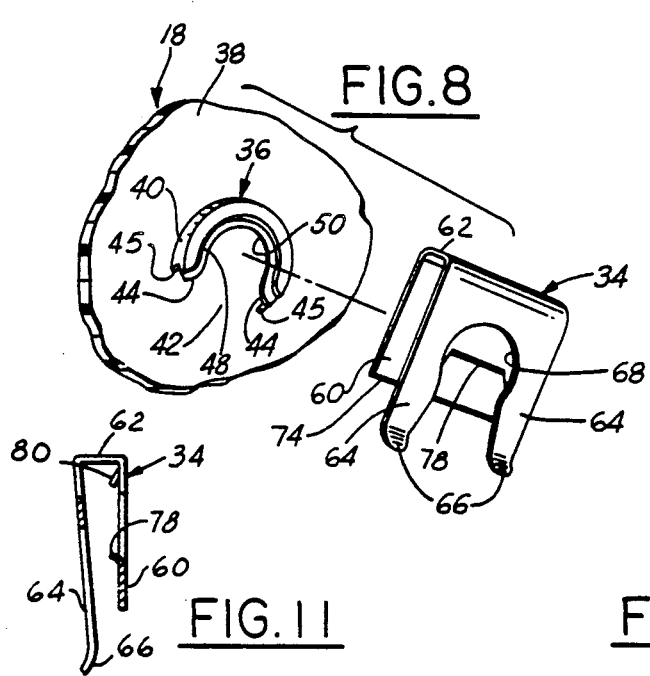
FIG. 8
FIG. 11
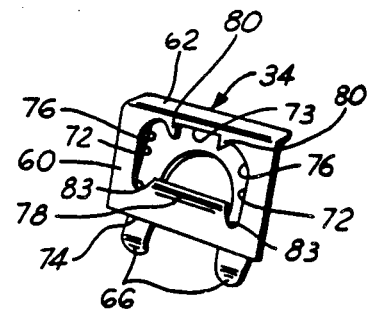
FIG. 9
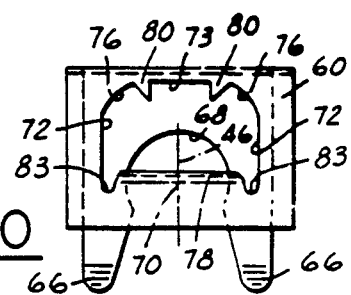
FIG. 10

ATTACHMENT CLIP FOR SEAT BACK SIDE SHIELD

BACKGROUND OF THE INVENTION

This invention relates generally to vehicle seat structures and more particularly to an improved clip arrangement for securing a side shield to vehicle seat back.

One example of a prior art side shield attachment arrangement presently used on automotive vehicles is shown in the U.S. Pat. No. 4,722,571 issued Feb. 2, 1988 to M. J. Sweers. In prior art FIG. 12 of the drawings there is shown an enlarged elevational view of metal clip 34' disclosed in the Sweers patent FIG. 12 shows the inner surface of a plastic seat side shield 18' integrally formed with a raised block 36' adapted to be secured as by heat-staking to a metal clip 34. The side shield 18' is secured by virtue of the clip legs 64' being captured by a slotted pivot pin projecting outwardly from the seat recliner apparatus. An improved securing arrangement involved integrally molding a clip-like button on the inner surface of the side shield shaped to engage an associated slotted pivot pin 37' on the seat recliner apparatus. It has been found, however, that with variances in seat back upholstery covering material and seat padding such integrally molded attachment buttons present problems during assembly line installation.

SUMMARY OF THE INVENTION

Accordingly, it is an object of the present invention to provide a novel and improved mounting arrangement to simply and reliably secure a trim panel to an automotive vehicle structure.

Another object of this invention is to provide an improved mounting clip arrangement for securing a side shield panel to a vehicle seat structure in order to expedite production and reduce the labor and costs involved.

Accordingly, the improved side shield attaching arrangement of the present invention provides a spring steel clip adapted for ready snap-on installation on a button-like connector integrally molded on the side shield inner surface.

BRIEF DESCRIPTION OF THE DRAWINGS

Other features and advantages of the invention, such as reduced number of parts and improved service disassembly, will be evident from the following detailed description of the preferred embodiment of the invention and the accompanying drawings wherein:

FIG. 1 is a perspective view of a pair of automobile seat structures e the improved seat back side panel mounting of the present invention;

FIG. 2 is an enlarged fragmentary side elevational view of the improved seat back side shield mounting arrangement of FIG. 1;

FIG. 3 is a fragmentary vertical cross sectional view taken on the line 3—3 of FIG. 2;

FIG. 4 is an enlarged fragmentary elevational view, with parts broken away, taken on the line 4—4 of FIG. 2;

FIG. 5 is a fragmentary cross sectional view taken on the line 5—5 of FIG. 4;

FIG. 6 is a fragmentary cross sectional view taken on the line 6—6 of FIG. 4;

FIG. 7 is a horizontal sectional view taken on the line 7—7 of FIG. 6;

FIG. 8 is a fragmentary exploded perspective view of a portion of the side shield and the attaching clip;

FIG. 9 is a detail perspective view of the attachment clip of the present invention;

FIG. 10 is an enlarged detail plane view of the spring clip of the present invention;

FIG. 11 is a side elevational view of the spring clip of FIG. 10; and

FIG. 12 is a fragmentary elevational view of a prior clip and prior art mounting arrangement.

DETAILED DESCRIPTION OF THE PREFERRED EMBODIMENT

Referring now to FIG. 1 of the drawings, a pair of side-by-side left and right vehicle seat structures are shown at 10 and 12 positioned in the front of forward portion of a motor vehicle passenger compartment. The left seat structure 10 on the drivers side includes a seat cushion 14 and a seat back 16. The seat cushion 14 is supported on a vehicle floor by a track mechanism (not shown) an example of which is disclosed in the U.S. Pat. No. 4,634,180 issued Jan. 6, 1987 to Zaveri et al. the disclosure of which is incorporated by reference herein. A seat latching mechanism of the type shown in the Zaveri patent is positioned on the rear or outboard side of the vehicle and covered by a side shield panel generally indicated at 18 in FIG. 1. A right hand side shield panel is partially shown at 20 for the seat structure 12. As the parts for the seat structures 10 and 12 are mirror images of each other, only the left seat structure will be shown and described.

With reference to FIG. 2, the left hand side shield panel 18 is shown covering a seat recliner latching apparatus and an operating lever, shown in outline by dashed lines at 22 and 24 respectively. The side shield panel 18 is adapted to be secured to the recliner apparatus 22 so as to rotate therewith about the axis of a transverse pivot bolt 26 extending outwardly from the recliner apparatus 22. The recliner operating lever 24 has its free end tongue portion 28 in captured engagement with a manual plastic button 30. The lever is adapted to be pivoted about pivot bolt 26 from a lower position to an upper position, indicated by phantom lines in FIG. 2, upon sliding movement of a manual plastic button to its upper phantom lined position 30.

The improved side shield panel 18 mounting arrangement of the present invention used on seat structure 10 is shown in FIGS. 2 and 3. In the disclosed embodiment the side shield panel 18 is secured to the recliner apparatus 22 at its upper end by a machine bolt 32. The bolt 32 is threaded through a bore of the latch mechanism and into a seat frame portion indicated partially at 33 in FIG. 3. The lower end of the side shield panel 18 is releasably attached to the recliner apparatus 22 by means of a spring steel clip generally indicated at 34 in FIGS. 2 and 3. The spring clip 34 is adapted for locking engagement on a raised half-round or C-shaped attachment collar, generally indicated at 36, molded integrally with inner surface 38 of the plastic side shield 18. The C-shaped collar 36 is adapted, in the prior art mode, to engage a circumferentially slotted pivot pin 37 extending outwardly from the recliner apparatus 22.

With reference to FIG. 8 of the drawings it will be seen that the existing C-shaped attachment collar 36 is generally C-shaped in plan having an arcuate outer peripheral wall 40 interrupted by a lead-in gap 42. It will be noted in FIG. 4 that the gap 42 is defined by two circumferentially spaced apart and diametrically opposed mirror image jaws 44, having undercut recesses 45 (FIG. 8), and disposed about symmetrical centerline 46 of the attachment collar 36. FIG. 5 shows the peripheral wall 40 sloped outwardly at a slight angle from the vertical. The C-shaped attachment collar 36 is formed with an inner arcuate flange 48, having an edge 50, with the inner flange 48 spaced a predetermined distance above the side shield inner surface 38.

Turning now to the present invention the spring steel clip 34, formed symmetrical about the center line 46 of FIG. 10, has a U-shaped bend defining an inner rectangular shaped body portion 60 and an outer return bent bifurcated portion interconnected by a planar bight portion 62. The bifurcated portion is of conventional construction, as seen in prior art FIG. 12, and has a longitudinal slot defining a pair of mirror image yieldable legs 64 terminating in outwardly bent tangs 66 at their free ends. The slot has a closed central semi-circular end 68 and an open end. The semi-circular end 68 defines a center of curvature 70 adapted to coincide with the center of curvature of the C-shaped collar 36 with the spring clip 34 locked thereon, as seen in FIG. 4. The spring clip body portion 60 is formed with a central D-shaped cutout defined by a pair of spaced longitudinal parallel internal side edges 72, a transverse chordal edge 73 parallel to body portion free edge 74 and located adjacent the bight portion 62. The chordal edge extends between a pair of curved internal fillets 76, and a transverse central tongue 78 in opposed relation to the chordal edge 73.

It will be noted in FIGS. 7 and 9 that a pair of laterally spaced pointed teeth or prongs 80, struck from the body portion 60, are located at each end of the chordal portion 73. The teeth 80 extend toward the slotted aperture semi-circular closed end portion 68 for a purpose to be explained. The clip body 60 portion 73 central tongue 78 is bent at a sloped obtuse angle so as to extend toward the clip semi-circular closed end 68. It will be noted in FIG. 9 that the central tongue 78 extends laterally between a pair of rounded notches 83 with each notch 83 establishing a juncture with its associated cutout longitudinal internal edge 72.

When the spring clip 34 is attached to the C-shaped collar 36 the D-shaped cutout tongue 78 is oriented across the lead-in gap 42 by virtue of the notches 83 being engagingly received in their associated pair of collar undercut recesses 45. The initial engagement of the clip notches 83 permit yielding of the tongue 78 for carrying out snap-fitted action of the clip. The free ends of the prongs 80 are adapted to engage the outer peripheral surface 40 of the collar upon press-fitting the clip D-shaped cutout downwardly on the C-shaped collar 36 so that they engage and bite into the surface 40 thereby securely gripping the collar under tension. The spring clip 34 is thus locked on the collar 36 permitting expansion and contraction of the parts due to temperature changes. The clip bifurcated portion legs 64 are thereby positioned inboard a predetermined increased distance in counter distinction to the prior art C-shaped attachment collar 36. The side shield panel 18 with its add-on clip 34, is thus adapted to be installed on oversized seat structures having a slightly larger dimension caused by the use of optional thicker upholstery, for example. Accordingly, the clip legs 64 readily engage the circumferentially slotted pivot pin 37 in their designed conventional manner.

While there is described above the principles of this invention in connection with a specific embodiment, it is to be clearly understood that this description is made only by way of example and not as a limitation to the scope of this invention.

What is claimed is:

1. In a vehicle seat structure comprising a seat back recliner apparatus having a pivot pin extending outboard therefrom, a plastic side shield panel for covering the seat back recliner apparatus, said panel having the inner surface thereof integrally molded with a raised cylindrical C-shaped attachment collar portion having an open end adapted to engage a circumferential slot formed in said pivot pin so as to retain said panel on said seat structure, said C-shaped attachment collar portion having an arcuate outer surface and an open end defined by a pair of diametrically opposed mirror image jaws, each said jaw spaced outwardly from said panel inner surface so as to define an under-cut recess therewith, wherein an add-on clip providing an improved arrangement for engaging said pivot pin circumferential slot comprising:

a spring steel clip having a U-shaped bend defining a rectangular-shaped inner body portion and an outer return bent bifurcated portion interconnected by a planar transverse bight portion, said return bent bifurcated portion defining a longitudinal slot having a closed semi-circular end and an open end, said longitudinal slot providing a pair of mirror image yieldable legs laying in the same plane, said closed end in the form of central semi-circular opening, said legs adapted to straddle said pivot pin circumferential slot in a releasably locked manner, said yieldable legs having the inner opposed edges thereof diverging toward their free ends from opposed shoulders, each said should defined by the juncture of said semi-circular opening with its associated diverging inner edge;

said clip inner body portion having a central substantially D-shaped cutout therein defined by a pair of spaced longitudinal internal edges, a transverse chordal edge adjacent said bight portion extending laterally between a pair of curvet fillets, and said clip inner body portion having a transverse central tongue in opposed relation to said chordal edge, said central tongue bent inwardly from said body portion at an obtuse angle, said central tongue having a free transverse edge with said transverse edge spaced a predetermined distance from said semi-circular opening, said central tongue extending laterally between a pair of rounded notches with each said notch establishing a juncture with its associated cutout longitudinal edge;

said chordal edge having an inwardly struck longitudinal extending prong at each of its junctions with an associated one of said curved fillets;

said spring clip D-shaped cutout sized to be received on said raised C-shaped collar in a snap-fitting manner such that each said notch extending into an associated one of said pair of jaw undercut recesses with said central tongue bridging said collar open end, and said clip prongs biting into and securely gripping said C-shaped collar outer surface whereby said pair of yieldable legs extend in a predetermine direction receiving said pivot pin circumferential slot in said longitudinal slot, whereby said yieldable legs releasably engage said pivot pin circumferential slot so as to secure said panel to said seat back recliner apparatus.

* * * * *